US012489866B2

(12) United States Patent
Yen et al.

(10) Patent No.: US 12,489,866 B2
(45) Date of Patent: Dec. 2, 2025

(54) VIDEO AND AUDIO STREAMING TRANSMISSION SYSTEM

(71) Applicant: BENQ CORPORATION, Taipei (TW)

(72) Inventors: Chao-Kuang Yen, Taipei (TW); Yu-Ping Huang, Taipei (TW); Chen-Chi Wu, Taipei (TW); Cheng-Pu Lin, Taipei (TW); Chia-Nan Shih, Taipei (TW); Jung-Kun Tseng, Taipei (TW)

(73) Assignee: BenQ Corporation, Taipei (TW)

( * ) Notice: Subject to any disclaimer, the term of this patent is extended or adjusted under 35 U.S.C. 154(b) by 254 days.

(21) Appl. No.: 18/484,465

(22) Filed: Oct. 11, 2023

(65) Prior Publication Data
US 2024/0275919 A1 Aug. 15, 2024

(30) Foreign Application Priority Data

Feb. 15, 2023 (TW) .................. 112105334

(51) Int. Cl.
H04N 7/14 (2006.01)
H04N 7/15 (2006.01)

(52) U.S. Cl.
CPC ............ H04N 7/147 (2013.01); H04N 7/15 (2013.01)

(58) Field of Classification Search
CPC ................. H04N 7/147; H04N 7/15
USPC ................................. 348/140.8
See application file for complete search history.

(56) References Cited

U.S. PATENT DOCUMENTS

| 2013/0024518 A1* | 1/2013 | Alexandrov ........ H04M 7/0027 709/204 |
| 2014/0118472 A1* | 5/2014 | Liu ........................ H04M 3/563 348/14.09 |
| 2016/0267923 A1* | 9/2016 | Goto ..................... H04M 3/568 |
| 2019/0205275 A1* | 7/2019 | Renard ............... H04L 63/0428 |
| 2020/0162618 A1 | 5/2020 | Enteshari et al. |
| 2021/0409547 A1* | 12/2021 | Channapragada .. H04L 12/1822 |
| 2022/0276974 A1 | 9/2022 | Renard et al. |
| 2022/0303502 A1 | 9/2022 | Fisher et al. |
| 2024/0323604 A1* | 9/2024 | Lin ....................... H04M 3/002 |

FOREIGN PATENT DOCUMENTS

| TW | 200517922 | 6/2005 |
| TW | 201116059 | 5/2011 |
| TW | 202038600 | 10/2020 |

OTHER PUBLICATIONS

"Search Report of Europe Counterpart Application", issued on Apr. 12, 2024, p. 1-p. 11.

* cited by examiner

Primary Examiner — Tung T Vo

(57) ABSTRACT

A video and audio streaming transmission system is provided. The video and audio streaming transmission system includes a receiving end module, a first transmitting end module and a second transmitting end module. The first transmitting end module obtains a first audio signal, and sends the first audio signal to the receiving end module. The second transmitting end module obtains a second audio signal, and sends the second audio signal to the receiving end module. The receiving end module returns a processed audio signal to the first computer device according to the first audio signal and the second audio signal, so that the first computer device provides the processed audio signal to a conference module.

20 Claims, 9 Drawing Sheets

VIDEO AND AUDIO STREAMING TRANSMISSION SYSTEM

CROSS-REFERENCE TO RELATED APPLICATION

This application claims the priority benefit of Taiwan application serial no. 112105334 filed on Feb. 15, 2023. The entirety of the above-mentioned patent application is hereby incorporated by reference herein and made a part of this specification.

BACKGROUND

Technical Field

The disclosure relates to a data transmission technology, and in particular relates to a video and audio streaming transmission system.

Description of Related Art

Specifically, within the conference room, there may be multiple users operating multiple computer devices simultaneously, and the respective microphone devices of these computer devices may collect the voices of the corresponding users. The conference software then plays these voices through the respective speaker devices of these computer devices. Consequently, the signals formed by the voices of multiple users are simultaneously provided to the conference software. After being played by the respective speaker devices of these computer devices, these voices are then collected by the respective microphone devices of these computer devices. In such a case, it would result in a severe issue of audio echo, thus compromising the quality of the conference.

SUMMARY

A video and audio streaming transmission system, which may effectively reduce or avoid the issue of audio echo caused by multiple audio devices collecting audio simultaneously during a conference, is provided in the disclosure.

The video and audio streaming transmission system of the disclosure is suitable for use in conjunction with a conference module for video and audio streaming transmission. The video and audio streaming transmission system includes a receiving end module, a first transmitting end module and a second transmitting end module. The first transmitting end module is coupled to a first computer device and the receiving end module. The first computer device executes the conference module. The second transmitting end module is coupled to a second computer device and the receiving end module. The second computer device executes the conference module. The first transmitting end module obtains a first audio signal. The first transmitting end module sends the first audio signal to the receiving end module. The second transmitting end module obtains a second audio signal. The second transmitting end module sends the second audio signal to the receiving end module. The receiving end module returns a processed audio signal to the first computer device according to the first audio signal and the second audio signal, so that the first computer device provides the processed audio signal to the conference module.

The video and audio streaming transmission system of the disclosure is suitable for use in conjunction with a conference module for video and audio streaming transmission. The video and audio streaming transmission system includes a receiving end module, a first transmitting end module and a second transmitting end module. The first transmitting end module is coupled to a first computer device and the receiving end module. The first computer device executes the conference module. The second transmitting end module is coupled to a second computer device and the receiving end module. The second computer device executes the conference module. The first transmitting end module obtains a first audio signal. The second transmitting end module obtains a second audio signal. The second transmitting end module sends the second audio signal to the receiving end module, so that the receiving end module sends the second audio signal to the first transmitting end module. The first transmitting end module generates a processed audio signal to the first computer device according to the first audio signal and the second audio signal, so that the first computer device provides the processed audio signal to the conference module.

The video and audio streaming transmission system of the disclosure is suitable for use in conjunction with a conference module for video and audio streaming transmission. The video and audio streaming transmission system includes a receiving end module, a first transmitting end module and a second transmitting end module. The first transmitting end module is coupled to a first computer device and the receiving end module. The first computer device executes the conference module. The second transmitting end module is coupled to a second computer device and the receiving end module. The second computer device executes the conference module. The first transmitting end module obtains a first audio signal. The first transmitting end module sends the first audio signal to the receiving end module. The second transmitting end module obtains a second audio signal. The second transmitting end module sends the second audio signal to the receiving end module. The receiving end module executes the conference module, and the receiving end module provides a processed audio signal to the conference module according to the first audio signal and the second audio signal.

Based on the above, the video and audio streaming transmission system of the disclosure may return the processed audio signal generated according to the first audio signal and the second audio signal to the conference module through a single audio source, so as to effectively reduce or avoid the issue of audio echo.

In order to make the above-mentioned features and advantages of the disclosure comprehensible, embodiments accompanied with drawings are described in detail below.

DETAILED DESCRIPTION OF DISCLOSED EMBODIMENTS

Figure 1:
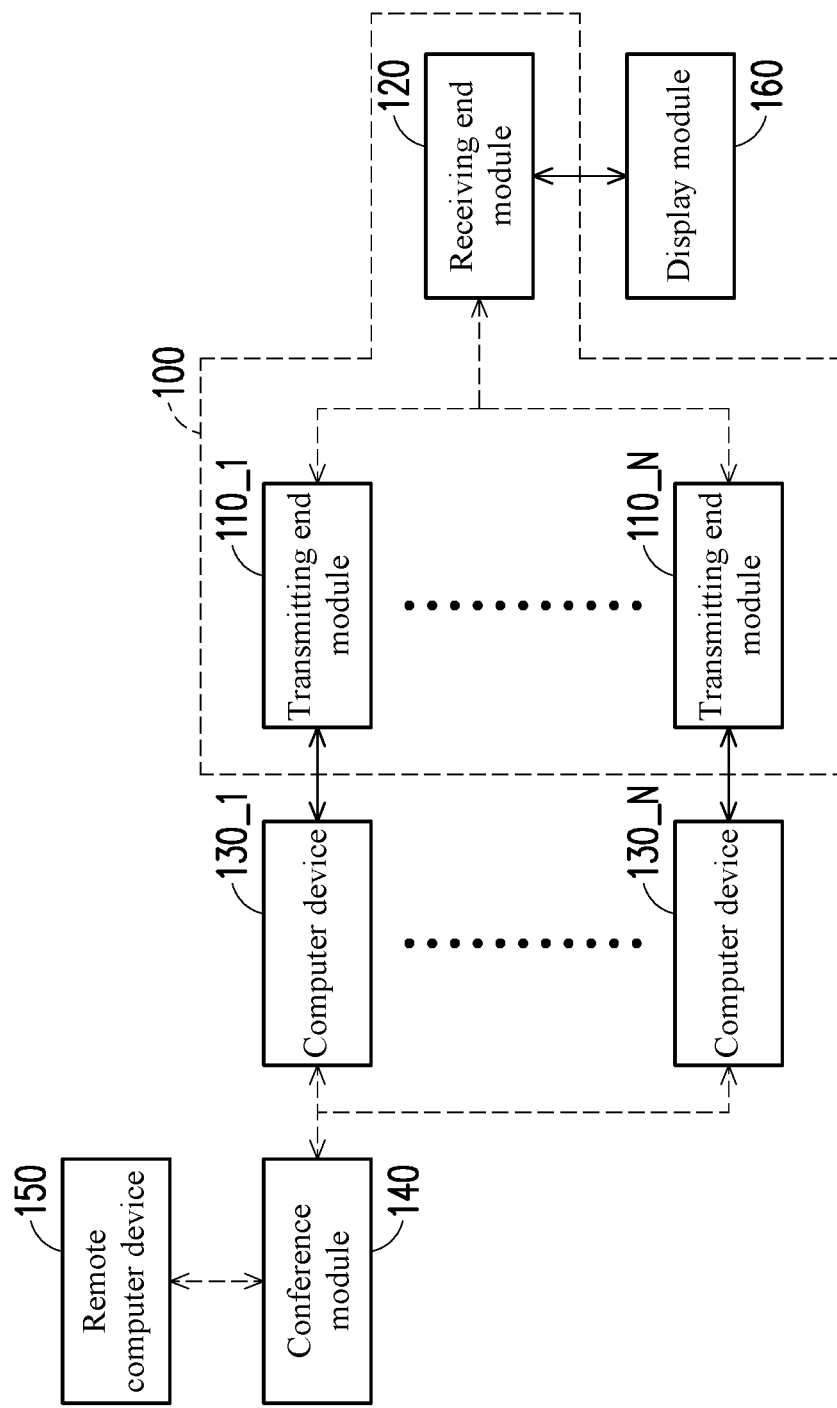
FIG. 1 is a schematic diagram of a video and audio streaming transmission system according to an embodiment of the disclosure.

In order to make the content of the disclosure easier to understand, the following specific embodiments are illustrated as examples of the actual implementation of the disclosure. In addition, wherever possible, elements/components/steps with the same reference numerals in the drawings and embodiments represent the same or similar parts.

FIG. 1 is a schematic diagram of a video and audio streaming transmission system according to an embodiment of the disclosure. Referring to FIG. 1, the video and audio streaming transmission system 100 includes transmitting end modules (TX) 110_1 to 110_N and a receiving end module (RX) 120, where N is a positive integer. In this embodiment, the transmitting end modules 110_1 to 110_N are coupled to the receiving end module 120, and are respectively coupled to the computer devices 130_1 to 130_N. The conference module 140 is coupled to the computer devices 130_1 to 130_N and the remote computer device 150. The receiving end module 120 is coupled to the display module 160. In this embodiment, the conference module 140 may be an online conference software. The computer devices 130_1 to 130_N and the remote computer device 150 may respectively execute the application program of the conference module 140, for example, to connect to the server running the online conference platform through the Internet to realize the online conference. The conference software may be, for example, a "skype" video call software or a "zoom" video conference software, but the disclosure is not limited thereto.

In addition, it should be noted that the transmitting end modules 110_1 to 110_N and the receiving end module 120 of the disclosure are respectively implemented by corresponding physical devices and/or corresponding application programs.

In this embodiment, the computer devices 130_1 to 130_N may be disposed in the same conference room or the same indoor environment, and respectively operated by multiple users. The remote computer device 150 may be operated, for example, by a remote conference participant, and the disclosure does not limit the number of remote computer devices. The computer devices 130_1 to 130_N may respectively be, for example, a computer device equipped with a central processing unit (CPU) and/or a graphics processing unit (GPU), such as a laptop computer, a desktop computer, a tablet computer), etc. In this embodiment, the display module 160 may include, for example, a display and a smart soundbox device to provide, for example, broadcasting functions of video and audio in a conference room. In one embodiment, the display module 160 may further include a microphone device and/or a speaker device. In another embodiment, the receiving end module 120 may also be configured in the display module 160 in the form of an application program.

In this embodiment, the transmitting end modules 110_1 to 110_N may respectively have a microphone device for collecting sound to obtain multiple audio signals. The computer devices 130_1 to 130_N may respectively establish their own virtual microphone devices according to the transmitting end modules 110_1 to 110_N, and the computer devices 130_1 to 130_N may respectively select their respective virtual microphone devices to join the online conference conducted by the conference module 150. In this regard, the user may collect sound through the microphone devices of the transmitting end modules 110_1 to 110_N or the built-in microphone devices of the computer devices 130_1 to 130_N to generate multiple audio signals. It should be noted that the respective virtual microphone devices established by the transmitting end modules 110_1 to 110_N may firstly divert their corresponding audio signals to the receiving end module 120 instead of directly providing them to the conference module 150. The transmitting end modules 110_1 to 110_N may respectively return these audio signals to the receiving end module 120. The receiving end module 120 may generate a processed audio signal according to these audio signals, and return the processed audio signal to the computer device 130_1 through the transmitting end module 110_1, so that the computer device 130_1 may provide the processed audio signal to the remote computer device 150 through the conference module 140. The conference module 140 sends the processed audio signal received through the computer device 130_1 to the remote computer device 150 executing the conference module 140. In this way, the receiving end module 120 may perform audio processing on multiple audio sources, and the conference module 140 may obtain the processed audio signal only through a single audio signal source (i.e., the computer device 130_1), which may effectively reduce or avoid the issue of audio echo.

In this embodiment, at least one of the computer devices 130_1 to 130_N may also provide at least one image signal (e.g., conference briefing data) to the corresponding transmitting end module, so that the corresponding transmitting end module may provide at least one image signal to the receiving end module 120. The receiving end module 120 may generate a synthesized image signal (i.e., synthesizing one or more projection screens shared by one or more users into a merged screen) according to at least one image signal. The receiving end module 120 may return the synthesized image signal so that the remote computer device 150 may obtain the synthesized image signal through the conference module 140. The receiving end module 120 may provide the processed audio signal and synthesized image signal to the display module 160 to play the audio and video (e.g., broadcasting conference audio and playing conference briefing) and the synthesized image signal through the display module 160. In one embodiment, the receiving end module 120 may also be integrated in the display module 160 or implemented in the form of an application program (executed by the processor of the display module 160). Moreover, the conference participants operating the remote computer device 150 may play audio (processed audio signal) and video through the remote computer device 150 executing the conference module 140 to perform online conference functions. In this embodiment, the receiving end module 120 may further provide the synthesized image signal to the display module 160 for display.

In an embodiment, the video and audio streaming transmission system 100 may further include a central management device and/or a speaker device. The central management device and/or the speaker device may be connected to the receiving end module 120 and configured to set one of the transmitting end modules 110_1 to 110_N as an audio diversion target. In an embodiment, the video and audio streaming system 100 may further include a central management device. Alternatively, the central management device may also be configured to set whether to provide the processed audio signal to the speaker device coupled to the receiving end module 120. In one embodiment, the central management device may also be configured to set the audio source for generating the processed audio signal. In other words, the central management device may select to use the audio signal of at least one of the transmitting end modules 110_1 to 110_N to generate the processed audio signal, and it may even be directly generated by the microphone device of at least one of the transmitting end modules 110_1 to 110_N or the computer devices 130_1 to 130_N. In an embodiment, the central management device may be implemented by another computer device, one of the computer devices 130_1 to 130_N, or the display module 160. In one embodiment, the central management device may also include a human-machine interface or a user interface for the user to operate and realize the above-mentioned setting and control. In one embodiment, the speaker device may also be integrated into the display module 160.

Figure 2:
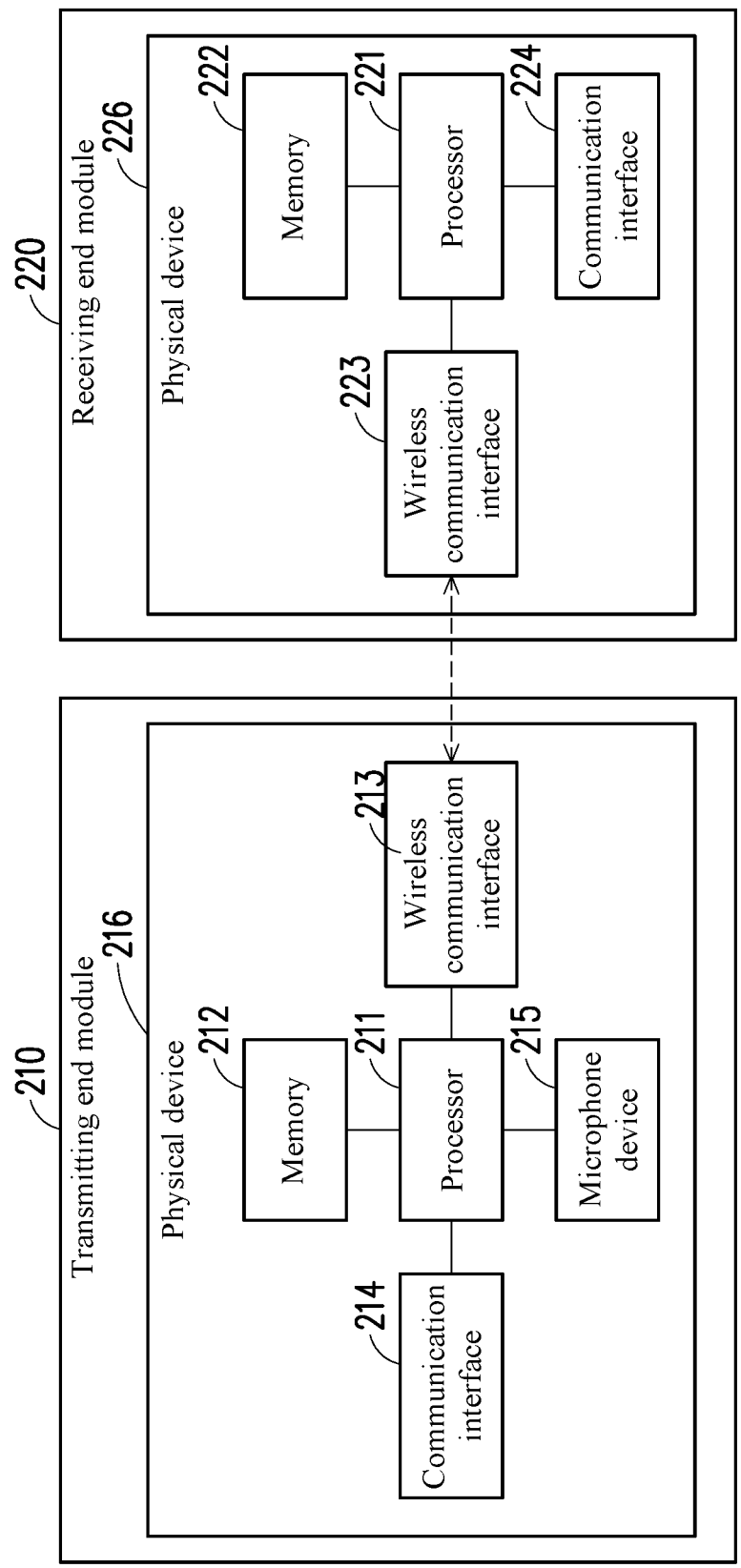
FIG. 2 is a schematic diagram of a transmitting end module and a receiving end module according to an embodiment of the disclosure.

FIG. 2 is a schematic diagram of a transmitting end module and a receiving end module according to an embodiment of the disclosure. Referring to FIG. 2, the transmitting end module and receiving end module mentioned in various embodiments of the disclosure may be implemented, for example, in the form of the transmitting end module 210 and the receiving end module 220 in FIG. 2, but the disclosure is not limited thereto. In this embodiment, the transmitting end module 210 may include a processor 211, a memory 212, a wireless communication interface 213, a communication interface 214, a microphone device 215, and a physical device 216. The physical device 216 may be a casing of the transmitting end module 210 and/or include relevant necessary physical components. The processor 211, the memory 212, the wireless communication interface 213, the communication interface 214, and the microphone device 215 are disposed in the physical device 216. In this embodiment, the receiving end module 220 may include a processor 221, a memory 222, a wireless communication interface 223, a communication interface 224, and a physical device 226. The physical device 226 may be a casing of the receiving end module 220 and/or include relevant necessary physical components. The processor 221, the memory 222, the wireless communication interface 223, and the communication interface 224 are disposed in the physical device 226.

In this embodiment, the communication interface 214 may include, for example, an HDMI transmission module and/or a Type-C transmission module, so that the transmitting end module 210 may be connected to a corresponding computer device through the HDMI transmission line and/or the Type-C transmission line coupled to the communication interface 214, so as to realize the data transmission function. In this embodiment, the wireless communication interface 213 and the wireless communication interface 223 may respectively include a Wi-Fi transmission module or a Bluetooth transmission module, so that the transmitting end module 210 may be connected to the wireless communication interface 223 of the receiving end module 220 through the wireless communication interface 213, so as to realize the data transmission function. In this embodiment, the communication interface 224 may include, for example, an HDMI transmission module and/or a Type-C transmission module, so that the receiving end module 220 may be connected to the display module through the HDMI transmission line and/or the Type-C transmission line coupled to the communication interface 224, so as to realize the data transmission function.

In this embodiment, the processors 211 and 221 may respectively be, for example, a system on a chip (SOC), or may include, for example, a central processing unit (CPU) or other programmable general-purpose or special-purpose microprocessor, a digital signal processor (DSP), a programmable controller, an application specific integrated circuit (ASIC), a programmable logic device (PLD), or other similar processing devices or a combination of these devices. In this embodiment, the memories 212 and 222 may be, for example, dynamic random access memory (DRAM), flash memory, or non-volatile random access memory (NVRAM), etc.

In this embodiment, the corresponding computer device may establish a virtual microphone device according to the transmitting end module 210, and the corresponding computer device may select the virtual microphone device to join the remote conference conducted by the conference module. Specifically, when the corresponding computer device installs the transmitting end module 210 in the form of software and/or hardware, the corresponding computer device may generate and display the selection information of the microphone device corresponding to the transmitting end module 210, and after installing the corresponding software of the virtual microphone device on the corresponding computer device, the conference module executed by the corresponding computer device may display the selection information of the virtual microphone device for receiving the processed audio signal generated by the receiving end module 220. In this way, when the corresponding computer device executes the conference module (i.e., the online (remote) conference software), the corresponding computer device may register the transmitting end module 210 as a virtual microphone, so that the user may collect sound through the microphone device 215 of the transmitting end module 210. Moreover, the transmitting end module 210 may transmit the audio signal generated by the microphone device 215 to the receiving end module 220, so that the receiving end module 220 may perform audio processing to generate a processed audio signal. Then, the conference module executed by the corresponding computer device may receive the processed audio signal by selecting to use the virtual microphone device of the receiving end module 220, so as to play the processed audio signal in the remote conference. In other words, the virtual microphone device may use the microphone device 215 of the transmitting end module 210 to collect sound, but output the processed audio signal provided by the receiving end module 220 to the conference module executed by the corresponding computer device.

It should be noted that the aforementioned registration of the transmitting end module 210 as a virtual microphone means that the conference module may set (or regard) the transmitting end module 210 as a sound source (i.e., as an external microphone device), to receive the audio signal provided by the microphone device 215 of the transmitting end module 210. Moreover, the registration may mean that the conference module recognizes the transmitting end module 210 as multiple external microphone devices, and for example, changes the hardware registration identification code of the transmitting end module 210 to the hardware registration identification code of the virtual microphone corresponding to the online conference software. From another point of view, regardless of the source of the audio signal of the transmitting end module 210 (may be from the microphone device of the transmitting end module 210 or provided by the microphone device of the corresponding computer device), the conference module may directly regard the transmitting end module 210 as a virtual microphone that may provide audio signals.

In one embodiment, the transmitting end module 210 may not include the microphone device 215, and may receive the audio signal provided by the built-in microphone device of the corresponding computer device through the communication interface 214, and further provide the audio signal to the receiving end module 220 for the aforementioned audio processing.

In one embodiment, the processor 211 of the transmitting end module 210 may also generate (establish) at least one virtual extended display identification data (EDID), and store it in the memory 212. The processor 211 of the transmitting end module 210 may provide at least one virtual extended display identification data to the corresponding computer device through the communication interface 214. In this way, the computer device may automatically identify at least one virtual display coupled with it according to the received at least one virtual extended display identification data, so that the computer device may correspondingly output at least one video and audio stream (i.e., image signal) to the transmitting end module 210. In this embodiment, the processor 211 of the transmitting end module 210 may generate multiple virtual extended display identification data, and these virtual extended display identification data may be the same setting data or different setting data. In other words, in one embodiment, the transmitting end module 210 may synchronously provide multiple image signals to the receiving end module 220, so that the receiving end module 220 may synchronously provide these image signals to the display module for merged display. In one embodiment, the receiving end module 220 may also simultaneously receive multiple image signals provided by multiple transmitting end modules, and provide them to the display module for merged display.

In this embodiment, the receiving end module 220 may receive the audio signal provided by the microphone device 215 of the transmitting end module 210 and the audio signals of other transmitting end modules through the wireless communication interface 223. The processor 221 of the receiving end module 220 may be (or include) an audio processing chip, and may perform acoustic echo cancellation (AEC) and/or other audio processing on these audio signals through artificial intelligence (AI) or related software algorithms, such as audio filter pass, automatic gain control (AGC) and/or active noise cancellation (ANC), etc., to generate a processed audio signal. The audio processing chip is configured for generating a processed audio signal. In this embodiment, the receiving end module 220 may return the processed audio signal to the wireless communication interface 213 of the transmitting end module 210 through the wireless communication interface 223, and then provide the processed audio signal to the corresponding computer device through the communication interface 214 of the transmitting end module 210, so that the conference module executed by the corresponding computer device may receive the processed audio signal, and then provide it to the remote computer device.

It should be noted that the audio processing described in various embodiments of the disclosure may, for example, refer to performing audio synthesis on these audio signals (i.e., synthesizing multiple audio signals into a single audio signal), and may retain, increase and/or optimize the audio signal provided by the microphone device 215 of the transmitting end module 210 or provided by the built-in microphone device of a corresponding computer device coupled to the transmitting end module 210, and may also eliminate audio signals provided by other transmitting end modules to generate a processed audio signal. In an embodiment, the audio processing described in each embodiment of the disclosure may also have the function of directly disabling the microphone devices of other transmitting end modules.

In one embodiment, the receiving end module 220 may also receive audio signals from other transmitting end modules through the wireless communication interface 223, and further provide audio signals provided by other transmitting end modules to the transmitting end module 210 through the wireless communication interface 223. In regard to this, the processor 211 of the transmitting end module 210 may receive the audio signal provided by the microphone device 215 and receive the audio signal provided by other transmitting end modules through the wireless communication interface 213. The processor 211 of the transmitting end module 210 may be (or include) an audio processing chip, and may perform acoustic echo cancellation (AEC) and/or other audio processing on these audio signals through artificial intelligence (AI) or related software algorithms, such as audio filter pass, automatic gain control (AGC) and/or active noise cancellation (ANC), etc., to generate a processed audio signal. The audio processing chip is configured for generating a processed audio signal. In this embodiment, the processor 211 of the transmitting end module 210 may provide the processed audio signal to the corresponding computer device through the communication interface 214, so that the conference module executed by the corresponding computer device may receive the processed audio signal.

In an embodiment, the receiving end module 220 may also be set in the display module or implemented by an application program. If the receiving end module 220 is completely implemented by an application program, the display module or electronic device that executes the application program may also receive multiple audio signals, and enable the application program to process these audio signals to generate a processed audio signal.

In one embodiment, the processor 221 of the receiving end module 220 may also have the function of executing a conference module, and may be wired or wirelessly connected to a router through a corresponding network communication means to connect to the Internet, and directly provide the processed audio signal to the conference module, thereby providing it to the remote computer device. In other words, the receiving end module 220 may collect audio signals provided by multiple transmitting end modules, and directly upload the processed audio signal to the conference module.

Figure 3:
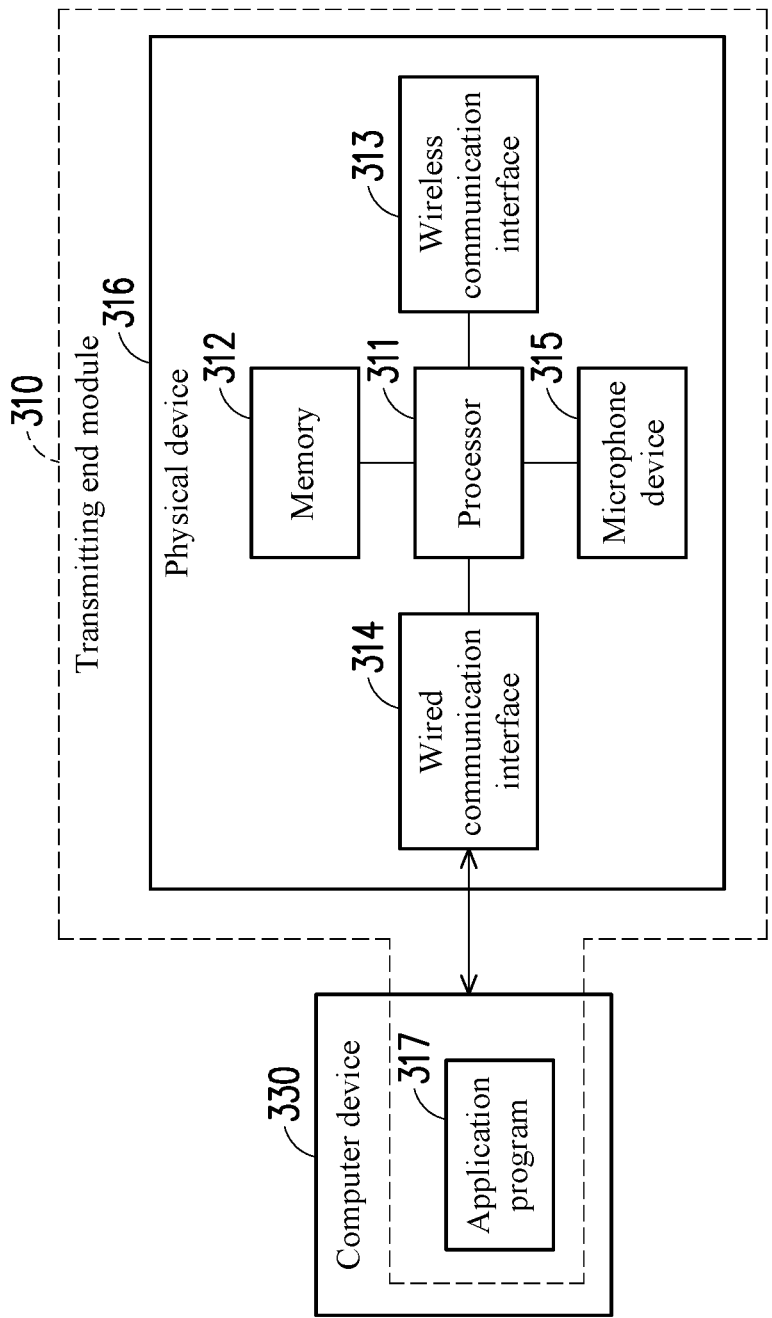
FIG. 3 is a schematic diagram of a transmitting end module according to another embodiment of the disclosure.

FIG. 3 is a schematic diagram of a transmitting end module according to another embodiment of the disclosure. Referring to FIG. 3, the transmitting end module mentioned in various embodiments of the disclosure may be implemented, for example, in the form of the transmitting end module 310 in FIG. 3, but the disclosure is not limited thereto. In this embodiment, the transmitting end module 310 may include a processor 311, a memory 312, a wireless communication interface 313, a communication interface 314, a microphone device 315, a physical device 316, and an application program 317. The physical device 316 may be a casing of the transmitting end module 310 and/or include relevant necessary physical components. The processor 311, the memory 312, the wireless communication interface 313, the communication interface 314, and the microphone device 315 are disposed in the physical device 316. The communication interface 314 of the transmitting end module 310 may be coupled to the computer device 330. In this embodiment, the application program 317 is installed in the computer device 300. The computer device 300 may execute the application program 317 of the transmitting end module 310 to connect with the wireless communication interface of the receiving end module.

In this embodiment, the application program 317 may receive the processed audio signal returned by the wireless communication interface of the receiving end module, so that the conference module executed by the computer device 330 may receive the processed audio signal. In other words, compared to the embodiment in FIG. 2, the processed audio signal generated by the receiving end module may also be directly provided to the computer device 330, so that the conference module executed by the computer device 330 may directly receive the processed audio signal.

In one embodiment, the transmitting end module 310 may not include the microphone device 315, and may receive the audio signal provided by the built-in microphone device of the computer device 300 through the communication interface 314, and further provide the audio signal to the receiving end module for the aforementioned audio processing.

In one embodiment, the processor 311 of the transmitting end module 310 may also receive audio signal provided by the microphone device 315, and receive audio signal provided by other transmitting end modules sent by the receiving end module through the wireless communication interface 313. The processor 311 of the transmitting end module 310 may further provide these audio signals to the computer device 330 through the communication interface 314, so that the application program 317 may perform acoustic echo cancellation and/or other audio processing on these audio signals, such as audio filter pass, automatic gain control and/or active noise cancellation, etc., to generate a processed audio signal, so that the conference module executed by the computer device 330 may directly obtain the processed audio signal generated by the application program 317. In other words, the application program 317 may include an audio processing module (audio processing program), so that the computer device 330 or the application program 317 may execute the audio processing module to perform audio processing on these audio signals.

In one embodiment, the transmitting end module 310 may also be completely implemented by the application program 317 without the physical device 316. If the transmitting end module 310 is completely implemented by the application program 317, the computer device 300 that executes the application program 317 may also receive multiple audio signals, and enable the application program 317 to process these audio signals to generate a processed audio signal.

Figure 4:
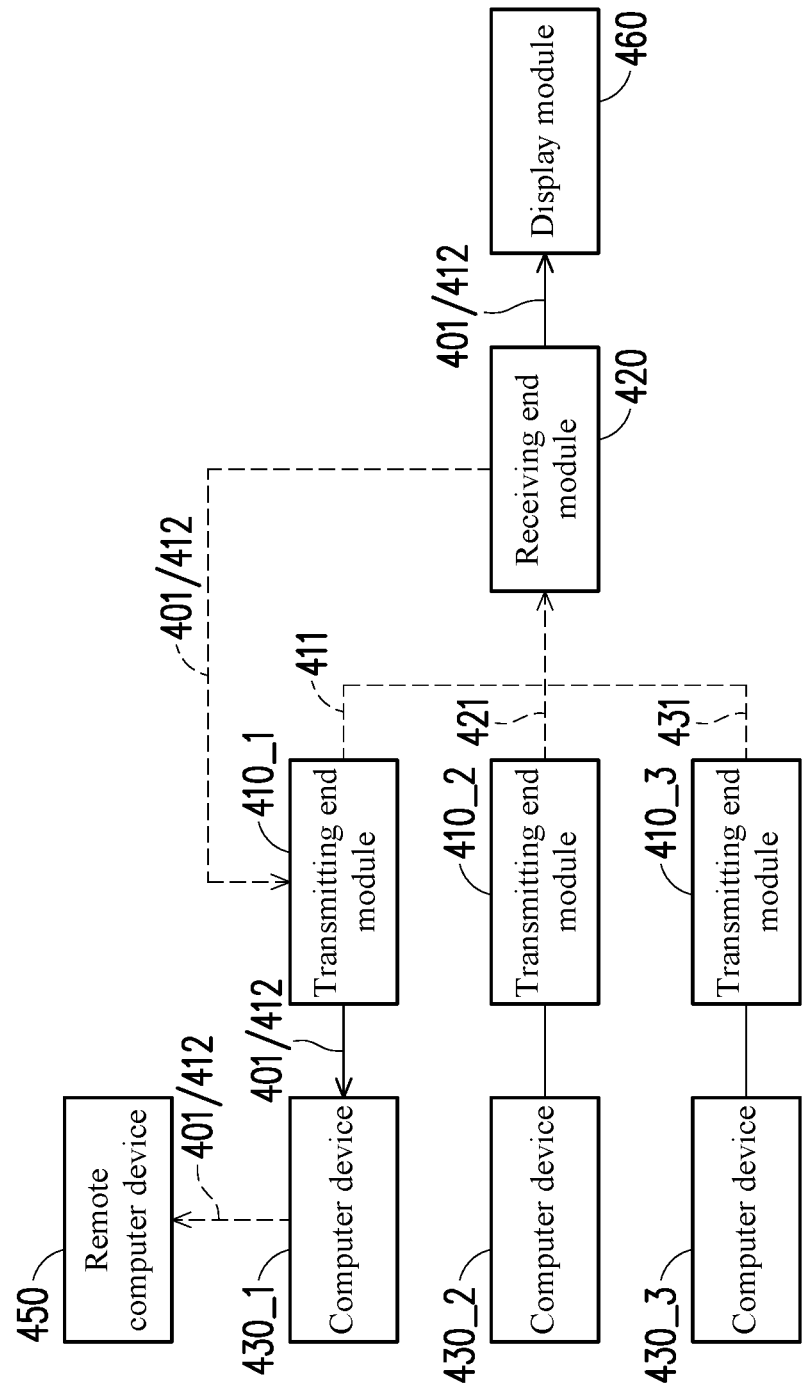
FIG. 4 is a video and audio streaming transmission schematic diagram of the video and audio streaming transmission system according to an embodiment of the disclosure.

FIG. 4 is a video and audio streaming transmission schematic diagram of the video and audio streaming transmission system according to an embodiment of the disclosure. Referring to FIG. 4, three transmitting end modules 410_1 to 410_3 in conjunction with three computer devices 430_1 to 430_3 are used as an example embodiment for description. In this embodiment, the transmitting end modules 410_1 to 410_3 are coupled to the computer devices 430_1 to 430_3 and the receiving end module 420. The receiving end module 420 is coupled to the display module 460. The computer devices 430_1 to 430_3 may execute the conference module to connect with the remote computer device 450 for online conference. It should be noted that the hardware features, technical features, and implementation methods of the related devices and modules described in this embodiment may refer to the descriptions of other embodiments to obtain sufficient teachings, suggestions, and implementation instructions, so details are not repeated herein.

In this embodiment, the first user may operate the computer device 430_1 to conduct an online conference. The microphone device of the transmitting end module 410_1 may collect sound to collect the voice of the first user and the ambient sound (possibly including the voice of the second user and/or the third user) to generate an audio signal 411 (which may also be generated by the built-in microphone device of the computer device 430_1, and provided to the transmitting end module 410_1). The transmitting end module 410_1 may transmit the audio signal 411 to the receiving end module 420.

The second user may operate the computer device 430_2 to conduct an online conference, or the user simply operates the computer device 430_2 to implement the wireless microphone function to simply provide the audio of the user without executing the conference module. The microphone device of the transmitting end module 410_2 may collect sound to collect the voice of the second user and the ambient sound (possibly including the voice of the first user and/or the third user) to generate an audio signal 421 (which may also be generated by the built-in microphone device of the computer device 430_2, and provided to the transmitting end module 410_2). The transmitting end module 410_2 may transmit the audio signal 421 to the receiving end module 420.

The third user may operate the computer device 430_3 to conduct an online conference, or simply operate the computer device 430_3 to implement the wireless microphone function to simply provide the audio of the user without executing the conference module. The microphone device of the transmitting end module 410_3 may collect sound to collect the voice of the third user and the ambient sound (possibly including the voice of the first user and/or the second user) to generate an audio signal 431 (which may also be generated by the built-in microphone device of the computer device 430_3, and provided to the transmitting end module 410_3). The transmitting end module 410_3 may transmit the audio signal 431 to the receiving end module 420.

In this embodiment, the receiving end module 420 may generate the processed audio signal 401 according to the audio signals 411, 421, and 431. The processed audio signal 401 may, for example, undergo the audio processing described in the above-mentioned embodiments, so details are not repeated herein. In one embodiment, the first user may be a conference moderator, but the disclosure is not limited thereto. The receiving end module 420 may only retain and optimize the audio signal 411 to generate the processed audio signal 401 (the audio signals 421 and 431 may be filtered or the volume may be reduced). In this embodiment, the receiving end module 420 may also have an image processing function, but the disclosure is not limited thereto. The receiving end module 420 may receive the image data provided by at least one of the computer devices 430_1 to 430_3 through the corresponding transmitting end module, and the receiving end module 420 may perform image synthesis on the received image signal (i.e., image data, which may be, for example, presentation data, video and audio data, screen sharing data, or video image data, etc.) to generate a synthesized image signal 412. In this regard, if the receiving end module 420 receives multiple image signals provided by multiple computer devices, the receiving end module 420 may synthesize these image signals to generate a synthesized image signal 412. If the receiving end module 420 receives an image signal provided by a computer device, the receiving end module 420 may directly use the image signal as the synthesized image signal 412.

The receiving end module 420 may provide the processed audio signal 401 and the synthesized image signal 412 to the display module 460 for display and playback, and the receiving end module 420 may return the processed audio signal 401 and the synthesized image signal 412 to the transmitting end module 4101, so as to provide the processed audio signal 401 to the computer device 430_1 through the transmitting end module 410_1 In this way, the conference module executed by the computer device 4301 may receive the processed audio signal 401 and provide it to the remote computer device 450. The conference module executed by the remote computer device 450 in this embodiment may simply only receive the processed audio signal 401 returned by the computer device 430_1, instead of simultaneously receiving the audio signals 421 and 431 provided by the transmitting end modules 410_2 and 410_3, so as to effectively reduce or avoid the occurrence of audio echo (preventing all audio played through the speakers of computer devices from being re-recorded by their microphones which causes severe echo), which may provide excellent audio quality for conferences.

In addition, if the computer devices 430_1 to 430_3 all execute the conference module, the conference module of the computer device 430_1 does not play the processed audio signal 401, but may selectively play the audio signal provided by the remote computer device 450, and the conference modules of the computer devices 430_2 and 430_3 may selectively play the processed audio signal 401 and the audio signal provided by the remote computer device 450 (e.g., the second user and the third user use earphones to play audio, which do not play their own respective audio signal).

In an embodiment, the display module 460 may also include a microphone device. The display module 460 may provide the audio signal provided by the microphone device to the receiving end module 420, so that the receiving end module 420 may process the audio signals 411, 421 and 431 and the audio signal provided by the microphone device of the display module 460 to generate the processed audio signal 401. In another embodiment, assuming that the conference moderator uses the microphone device of the display module 460, the receiving end module 420 may only retain and optimize the audio signal provided by the microphone device of the display module 460 to generate the processed audio signal 401 (the audio signals 411, 421, and 431 may be filtered or the volume may be reduced).

Figure 5:
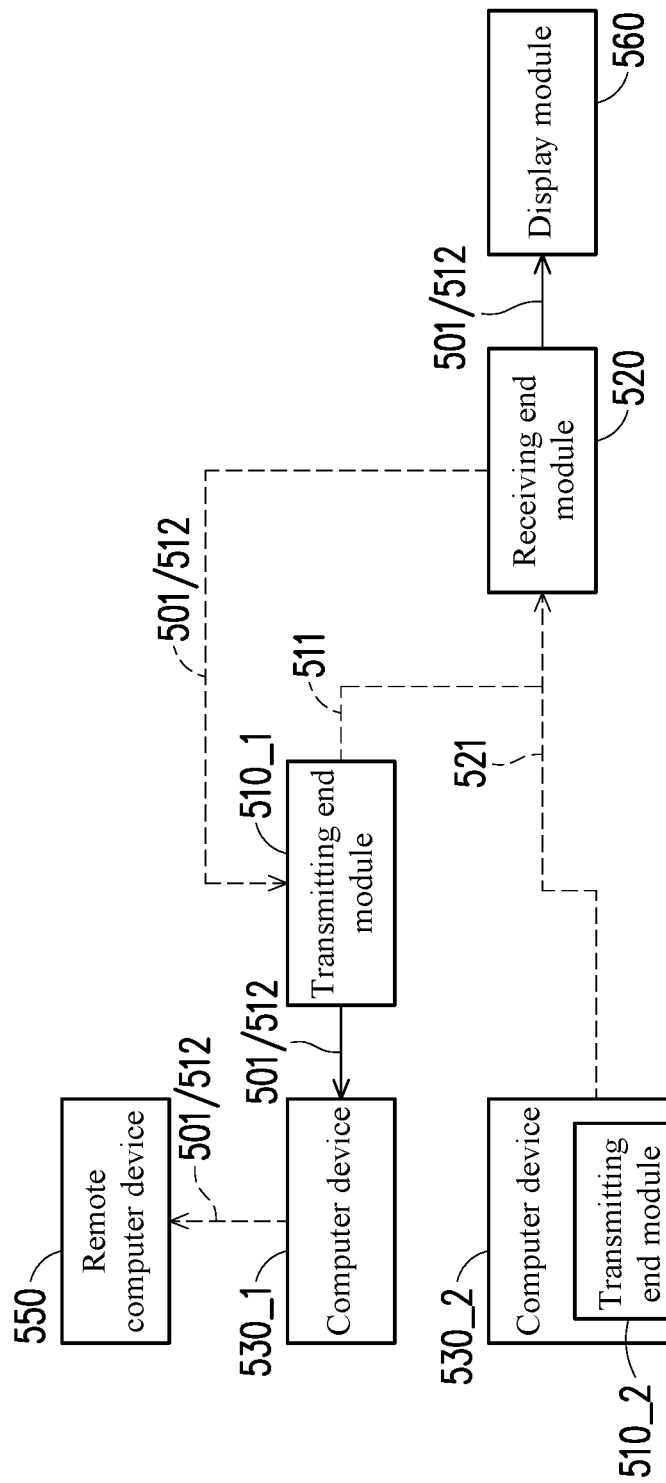
FIG. 5 is a video and audio streaming transmission schematic diagram of the video and audio streaming transmission system according to another embodiment of the disclosure.

FIG. 5 is a video and audio streaming transmission schematic diagram of the video and audio streaming transmission system according to another embodiment of the disclosure. Referring to FIG. 5, the transmitting end modules 510_1 and 510_2 in conjunction with the computer devices 530_1 and 530_2 are used as an example embodiment for description. In this embodiment, the transmitting end modules 510_1 and 510_2 are coupled to the computer devices 530_1 and 530_2 and the receiving end module 520. The receiving end module 520 is coupled to the display module 560. The computer devices 530_1 and 5302 may execute the conference module to connect with the remote computer device 550 for online conference. In this embodiment, the transmitting end module 510_2 is implemented in the form of an application program, and is executed by the computer device 530_2. It should be noted that the hardware features, technical features, and implementation methods of the related devices and modules described in this embodiment may refer to the descriptions of other embodiments to obtain sufficient teachings, suggestions, and implementation instructions, so details are not repeated herein.

In this embodiment, the first user may operate the computer device 530_1 to conduct an online conference. The microphone device of the transmitting end module 510_1 may collect sound to collect the voice of the first user and the ambient sound (possibly including the voice of the second user) to generate an audio signal 511 (which may also be generated by the built-in microphone device of the computer device 530_1, and provided to the transmitting end module 510_1). The transmitting end module 510_1 may transmit the audio signal 511 and the image signal 512 to the receiving end module 520.

The second user may operate the computer device 530_2 to conduct an online conference, or the user simply operates the computer device 530_2 to implement the wireless microphone function to simply provide the audio of the user without executing the conference module. The transmitting end module 510_2 may collect sound according to the built-in microphone device of the computer device 530_2 to collect the voice of the second user and the ambient sound (possibly including the voice of the first user) to generate an audio signal 521. The transmitting end module 510_2 may connect to the receiving end module 520 via a wired or wireless local area network connection through the computer device 5302 (the computer device 530_2 and the receiving end module 520 need to be in the same network area) to transmit the audio signal 521 to the receiving end module 520.

In this embodiment, the receiving end module 520 may generate the processed audio signal 501 according to the audio signals 511 and 521. The processed audio signal 501 may, for example, undergo the audio processing described in the above-mentioned embodiments, so details are not repeated herein. In one embodiment, the first user may be a conference moderator, but the disclosure is not limited thereto. The receiving end module 520 may only retain and optimize the audio signal 511 to generate the processed audio signal 501 (the audio signal 521 may be filtered or the volume may be reduced). In this embodiment, the receiving end module 520 may also have an image processing function, but the disclosure is not limited thereto. The receiving end module 520 may receive the image data provided by at least one of the computer devices 530_1 and 530_2 through the corresponding transmitting end module, and the receiving end module 520 may perform image synthesis on the received image signal (i.e., image data, which may be, for example, presentation data, video and audio data, screen sharing data, or video image data, etc.) to generate a synthesized image signal 512. In this regard, if the receiving end module 520 receives multiple image signals provided by multiple computer devices, the receiving end module 520 may synthesize these image signals to generate a synthesized image signal 512. If the receiving end module 520 receives an image signal provided by a computer device, the receiving end module 520 may directly use the image signal as the synthesized image signal 512.

The receiving end module 520 may provide the processed audio signal 501 and the synthesized image signal 512 to the display module 560 for display and playback, and the receiving end module 520 may return the processed audio signal 501 and the synthesized image signal 512 to the transmitting end module 510_1, so as to provide the processed audio signal 501 to the computer device 530_1 through the transmitting end module 510_1. In this way, the conference module executed by the computer device 5301 may receive the processed audio signal 501 and provide it to the remote computer device 550. The conference module executed by the remote computer device 550 in this embodiment may simply only receive the processed audio signal 501 returned by the computer device 530_1, instead of simultaneously receiving the audio signal 521 provided by the transmitting end module 5102, so as to effectively reduce or avoid the occurrence of audio echo (preventing all audio played through the speakers of computer devices from being re-recorded by their microphones which causes severe echo), which may provide excellent audio quality for conferences.

In addition, if the computer devices 530_1 and 530_2 all execute the conference module, the conference module of the computer device 530_1 does not play the processed audio signal 501, but may selectively play the audio signal provided by the remote computer device 550, and the conference module of the computer devices 5302 may selectively play the processed audio signal 501 and the audio signal provided by the remote computer device 550 (e.g., the second user uses earphones to play audio, which do not play its own audio signal).

In an embodiment, the display module 560 may also include a microphone device. The display module 560 may provide the audio signal provided by the microphone device to the receiving end module 520, so that the receiving end module 520 may process the audio signals 511 and 521 and the audio signal provided by the microphone device of the display module 560 to generate the processed audio signal 501. In another embodiment, assuming that the conference moderator uses the microphone device of the display module 560, the receiving end module 520 may only retain and optimize the audio signal provided by the microphone device of the display module 560 to generate the processed audio signal 501 (the audio signals 511 and 521 may be filtered or the volume may be reduced).

Figure 6:
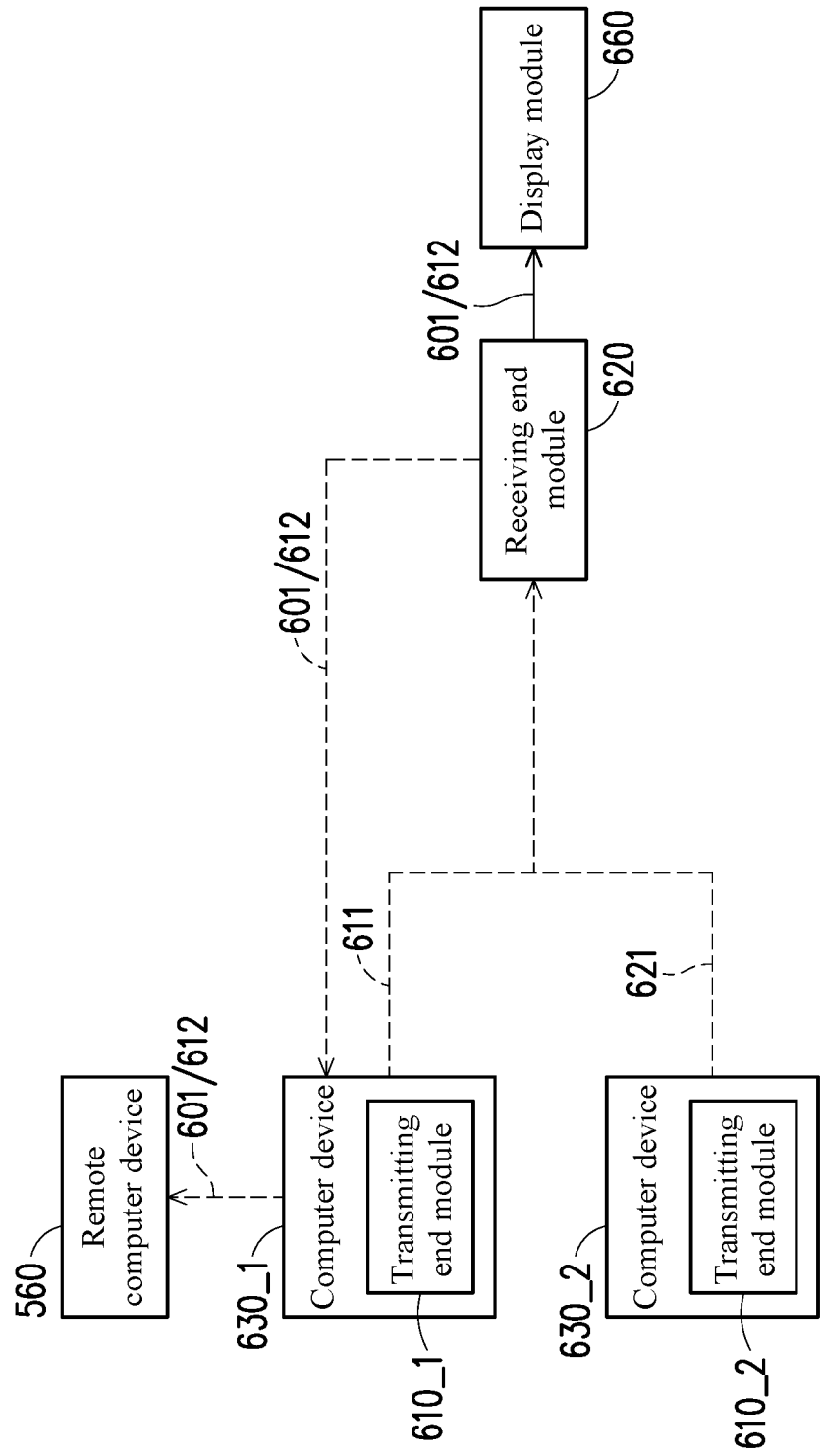
FIG. 6 is a video and audio streaming transmission schematic diagram of the video and audio streaming transmission system according to another embodiment of the disclosure.

FIG. 6 is a video and audio streaming transmission schematic diagram of the video and audio streaming transmission system according to another embodiment of the disclosure. Referring to FIG. 6, the transmitting end modules 610_1 and 610_2 in conjunction with the computer devices 630_1 and 630_2 are used as an example embodiment for description. In this embodiment, the transmitting end modules 610_1 and 610_2 are coupled to the computer devices 630_1 and 630_2 and the receiving end module 620. The receiving end module 620 is coupled to the display module 660. The computer devices 630_1 and 6302 may execute the conference module to connect with the remote computer device 650 for online conference. In this embodiment, the transmitting end modules 610_1 and 610_2 are respectively implemented in the form of an application program, and are respectively executed by the computer devices 630_1 and 630_2. It should be noted that the hardware features, technical features, and implementation methods of the related devices and modules described in this embodiment may refer to the descriptions of other embodiments to obtain sufficient teachings, suggestions, and implementation instructions, so details are not repeated herein.

In this embodiment, the first user may operate the computer device 630_1 to conduct an online conference. The transmitting end module 610_1 may collect sound according to the built-in microphone device of the computer device 630_1 to collect the voice of the first user and the ambient sound (possibly including the voice of the first user) to generate an audio signal 611. The transmitting end module 610_1 may transmit the audio signal 611 and the image signal 612 to the receiving end module 620 through the wireless communication interface of the computer device 630_1.

The second user may operate the computer device 630_2 to conduct an online conference, or simply operate the computer device 630_2 to implement the wireless microphone function to simply provide the audio of the user without executing the conference module. The transmitting end module 6102 may collect sound according to the built-in microphone device of the computer device 630_2 to collect the voice of the second user and the ambient sound (possibly including the voice of the first user) to generate an audio signal 621. The transmitting end module 610_2 may transmit the audio signal 621 to the receiving end module 620 through the wireless communication interface of the computer device 630_2.

In this embodiment, the receiving end module 620 may generate the processed audio signal 601 according to the audio signals 611 and 621. The processed audio signal 601 may, for example, undergo the audio processing described in the above-mentioned embodiments, so details are not repeated herein. In one embodiment, the first user may be a conference moderator, but the disclosure is not limited thereto. The receiving end module 620 may only retain and optimize the audio signal 611 to generate the processed audio signal 601 (the audio signal 621 may be filtered or the volume may be reduced). In this embodiment, the receiving end module 620 may also have an image processing function, but the disclosure is not limited thereto. The receiving end module 620 may receive the image data provided by at least one of the computer devices 630_1 and 630_2 through the corresponding transmitting end module, and the receiving end module 620 may perform image synthesis on the received image signal (i.e., image data, which may be, for example, presentation data, video and audio data, screen sharing data, or video image data, etc.) to generate a synthesized image signal 612. In this regard, if the receiving end module 620 receives multiple image signals provided by multiple computer devices, the receiving end module 620 may synthesize these image signals to generate a synthesized image signal 612. If the receiving end module 620 receives an image signal provided by a computer device, the receiving end module 620 may directly use the image signal as the synthesized image signal 612.

The receiving end module 620 may provide the processed audio signal 601 and the synthesized image signal 612 to the display module 660 for display and playback, and the receiving end module 620 may return the processed audio signal 601 to the transmitting end module 610_1, so as to provide the processed audio signal 601 to the computer device 630_1 through the transmitting end module 610_1. In this way, the conference module executed by the computer device 630_1 may receive the processed audio signal 601 and provide it to the remote computer device 650. In this way, the conference module executed by the remote computer device 650 in this embodiment may simply only receive the processed audio signal 601 returned by the computer device 630_1, instead of simultaneously receiving the audio signal 621 provided by the transmitting end module 6102, so as to effectively reduce or avoid the occurrence of audio echo (preventing all audio played through the speakers of computer devices from being re-recorded by their microphones which causes severe echo), which may provide excellent audio quality for conferences.

In addition, if the computer devices 630_1 and 630_2 all execute the conference module, the conference module of the computer device 630_1 does not play the processed audio signal 601, but may selectively play the audio signal provided by the remote computer device 550, and the conference module of the computer devices 5302 may selectively play the processed audio signal 601 and the audio signal provided by the remote computer device 650 (e.g., the second user uses earphones to play audio, which do not play its own audio signal).

In an embodiment, the display module 660 may also include a microphone device. The display module 660 may provide the audio signal provided by the microphone device to the receiving end module 620, so that the receiving end module 620 may process the audio signals 611 and 621 and the audio signal provided by the microphone device of the display module 660 to generate the processed audio signal 601. In another embodiment, assuming that the conference moderator uses the microphone device of the display module 660, the receiving end module 620 may only retain and optimize the audio signal provided by the microphone device of the display module 660 to generate the processed audio signal 601 (the audio signals 611 and 621 may be filtered or the volume may be reduced).

Figure 7:
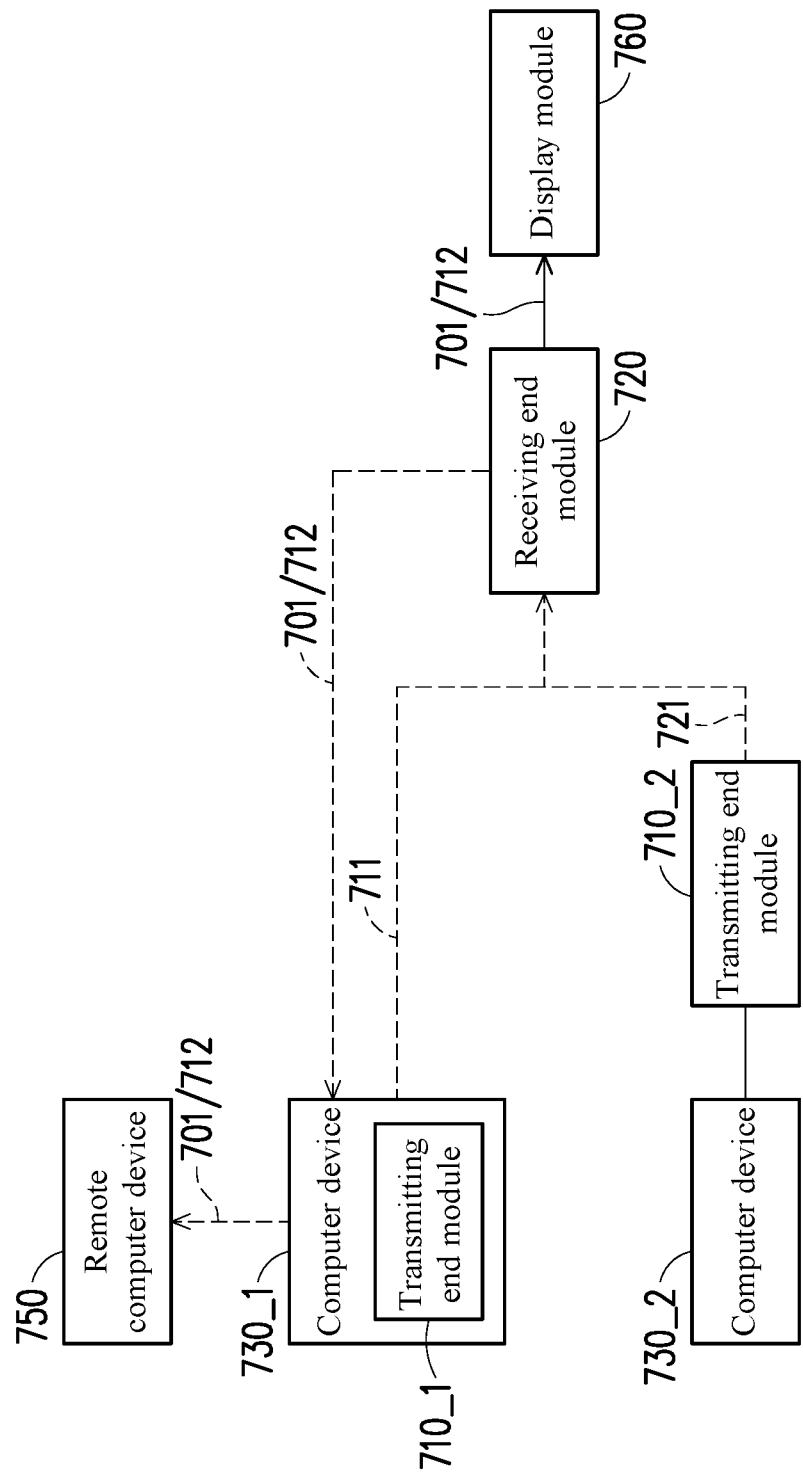
FIG. 7 is a video and audio streaming transmission schematic diagram of the video and audio streaming transmission system according to another embodiment of the disclosure.

FIG. 7 is a video and audio streaming transmission schematic diagram of the video and audio streaming transmission system according to another embodiment of the disclosure. Referring to FIG. 7, the transmitting end modules 710_1 and 710_2 in conjunction with the computer devices 730_1 and 730_2 are used as an example embodiment for description. In this embodiment, the transmitting end modules 710_1 and 710_2 are coupled to the computer devices 730_1 and 730_2 and the receiving end module 720. The receiving end module 720 is coupled to the display module 760. The computer devices 730_1 and 7302 may execute the conference module to connect with the remote computer device 750 for online conference. In this embodiment, the transmitting end module 710_1 is implemented in the form of an application program, and is executed by the computer device 730_1. It should be noted that the hardware features, technical features, and implementation methods of the related devices and modules described in this embodiment may refer to the descriptions of other embodiments to obtain sufficient teachings, suggestions, and implementation instructions, so details are not repeated herein.

In this embodiment, the first user may operate the computer device 730_1 to conduct an online conference. The transmitting end module 710_1 may collect sound according to the built-in microphone device of the computer device 730_1 to collect the voice of the first user and the ambient sound (possibly including the voice of the first user) to generate an audio signal 711. The transmitting end module 710_1 may connect to the receiving end module 720 via a wired or wireless local area network connection through the computer device 730_1 (the computer device 730_1 and the receiving end module 720 need to be in the same network area) to transmit the audio signal 711 to the receiving end module 720.

The second user may operate the computer device 730_2 to conduct an online conference, or the user simply operates the computer device 730_2 to implement the wireless microphone function to simply provide the audio of the user without executing the conference module. The microphone device of the transmitting end module 7102 may collect sound to collect the voice of the second user and the ambient sound (possibly including the voice of the first user) to generate an audio signal 721 (which may also be generated by the built-in microphone device of the computer device 7302, and provided to the transmitting end module 710_2). The transmitting end module 7102 may connect to the receiving end module 720 via a wired or wireless local area network connection through the computer device 7302 (the computer device 730_2 and the receiving end module 720 need to be in the same network area) to transmit the audio signal 721 to the receiving end module 720.

In this embodiment, the receiving end module 720 may generate the processed audio signal 701 according to the audio signals 711 and 721. The processed audio signal 701 may, for example, undergo the audio processing described in the above-mentioned embodiments, so details are not repeated herein. In one embodiment, the first user may be a conference moderator, but the disclosure is not limited thereto. The receiving end module 720 may only retain and optimize the audio signal 711 to generate the processed audio signal 701 (the audio signal 721 may be filtered or the volume may be reduced). In this embodiment, the receiving end module 720 may also have an image processing function, but the disclosure is not limited thereto. The receiving end module 720 may receive the image data provided by at least one of the computer devices 730_1 and 730_2 through the corresponding transmitting end module, and the receiving end module 720 may perform image synthesis on the received image signal (i.e., image data, which may be, for example, presentation data, video and audio data, screen sharing data, or video image data, etc.) to generate a synthesized image signal 712. In this regard, if the receiving end module 720 receives multiple image signals provided by multiple computer devices, the receiving end module 720 may synthesize these image signals to generate a synthesized image signal 712. If the receiving end module 720 receives an image signal provided by a computer device, the receiving end module 720 may directly use the image signal as the synthesized image signal 712.

The receiving end module 720 may provide the processed audio signal 701 and the synthesized image signal 712 to the display module 760 for display and playback, and the receiving end module 720 may return the processed audio signal 701 and the synthesized image signal 712 to the transmitting end module 7101, so as to provide the processed audio signal 701 to the computer device 730_1 through the transmitting end module 710_1. In this way, the conference module executed by the computer device 7301 may receive the processed audio signal 701 and provide it to the remote computer device 750. The conference module executed by the remote computer device 750 in this embodiment may simply only receive the processed audio signal 701 returned by the computer device 730_1, instead of simultaneously receiving the audio signal 721 provided by the transmitting end module 7102, so as to effectively reduce or avoid the occurrence of audio echo (preventing all audio played through the speakers of computer devices from being re-recorded by their microphones which causes severe echo), which may provide excellent audio quality for conferences.

In addition, if the computer devices 730_1 and 730_2 all execute the conference module, the conference module of the computer device 730_1 does not play the processed audio signal 701, but may selectively play the audio signal provided by the remote computer device 750, and the conference module of the computer devices 5302 may selectively play the processed audio signal 701 and the audio signal provided by the remote computer device 750 (e.g., the second user uses earphones to play audio, which do not play its own audio signal).

In an embodiment, the display module 760 may also include a microphone device. The display module 760 may provide the audio signal provided by the microphone device to the receiving end module 720, so that the receiving end module 720 may process the audio signals 711 and 721 and the audio signal provided by the microphone device of the display module 760 to generate the processed audio signal 701. In another embodiment, assuming that the conference moderator uses the microphone device of the display module 760, the receiving end module 720 may only retain and optimize the audio signal provided by the microphone device of the display module 760 to generate the processed audio signal 701 (the audio signals 711 and 721 may be filtered or the volume may be reduced).

Figure 8:
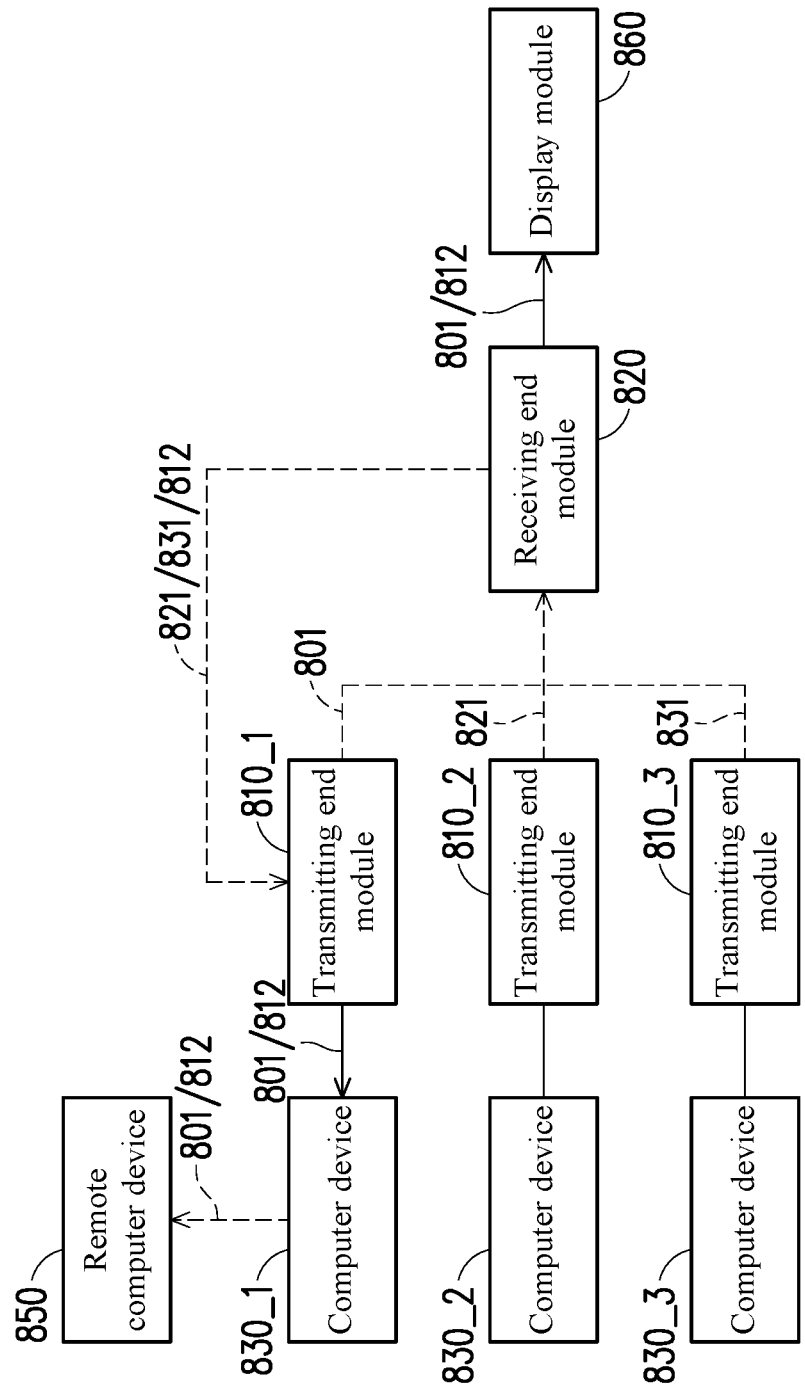
FIG. 8 is a schematic diagram of a video and audio streaming transmission system according to another embodiment of the disclosure.

FIG. 8 is a schematic diagram of a video and audio streaming transmission system according to another embodiment of the disclosure. Referring to FIG. 8, three transmitting end modules 810_1 to 810_3 in conjunction with three computer devices 830_1 to 830_3 are used as an example embodiment for description. In this embodiment, the transmitting end modules 810_1 to 810_3 are coupled to the computer devices 830_1 to 830_3 and the receiving end module 820. The receiving end module 820 is coupled to the display module 860. The computer devices 830_1 to 830_3 may execute the conference module to connect with the remote computer device 850 for online conference. It should be noted that the hardware features, technical features, and implementation methods of the related devices and modules described in this embodiment may refer to the descriptions of other embodiments to obtain sufficient teachings, suggestions, and implementation instructions, so details are not repeated herein.

In this embodiment, the first user may operate the computer device 830_1 to conduct an online conference. The microphone device of the transmitting end module 810_1 may collect sound to collect the voice of the first user and the ambient sound (possibly including the voice of the second user and/or the third user) to generate an audio signal (which may also be generated by the built-in microphone device of the computer device 830_1).

The second user may operate the computer device 830_2 to conduct an online conference, or the user simply operates the computer device 830_2 to implement the wireless microphone function to simply provide the audio of the user without executing the conference module. The microphone device of the transmitting end module 8102 may collect sound to collect the voice of the second user and the ambient sound (possibly including the voice of the first user and/or the third user) to generate an audio signal 821 (which may also be generated by the built-in microphone device of the computer device 830_2, and provided to the transmitting end module 810_2). The transmitting end module 810_2 may transmit the audio signal 821 to the receiving end module 820.

The third user may operate the computer device 830_3 to conduct an online conference, or simply operate the computer device 830_3 to implement the wireless microphone function to simply provide the audio of the user without executing the conference module. The microphone device of the transmitting end module 810_3 may collect sound to collect the voice of the third user and the ambient sound (possibly including the voice of the first user and/or the second user) to generate an audio signal 831 (which may also be generated by the built-in microphone device of the computer device 830_3, and provided to the transmitting end module 810_3). The transmitting end module 810_3 may transmit the audio signal 831 to the receiving end module 820.

In this embodiment, the receiving end module 820 may send the audio signals 821 and 831 to the transmitting end module 810_1, so that the transmitting end module 810_1 may generate the processed audio signal 801 according to the audio signal obtained by itself (i.e., corresponding to the voice of the first user) and the audio signals 821 and 831. The processed audio signal 801 may, for example, undergo the audio processing described in the above-mentioned embodiments, so details are not repeated herein. In one embodiment, the first user may be a conference moderator, but the disclosure is not limited thereto. The transmitting end module 810_1 may only retain and optimize its own audio signal to generate the processed audio signal 801 (the audio signals 821 and 831 may be filtered or the volume may be reduced). Alternatively, the receiving end module 820 may not send the audio signals 821 and 831 to the transmitting end module 810_1, so that the processed audio signal 801 only has the audio signal generated by the transmitting end module 810_1 itself. In this embodiment, the receiving end module 820 or the transmitting end module 810_1 may also have an image processing function, but the disclosure is not limited thereto. The receiving end module 820 or the transmitting end 8101 may receive the image data of least one of the computer devices 830_1 to 830_3, and the receiving end module 820 or the transmitting end 810_1 may perform image synthesis on the received image signal (i.e., image data, which may be, for example, presentation data, video and audio data, screen sharing data, or video image data, etc.) to generate a synthesized image signal 812. In this regard, if the receiving end module 820 or the transmitting end module 810_1 receives multiple image signals provided by multiple computer devices, the receiving end module 820 or the transmitting end module 810_1 may synthesize these image signals to generate a synthesized image signal 412. If the receiving end module 820 or the transmitting end module 810_1 receives an image signal provided by a computer device, the receiving end module 820 or the transmitting end module 810_1 may directly use the image signal as the synthesized image signal 812.

The transmitting end module 810_1 may provide the processed audio signal 801 and the synthesized image signal 812 to the receiving end module 820, and then provide them to the display module 860 for display and playback via the receiving end module 820. The transmitting end module 8101 provides the processed audio signal 801 to the computer device 830_1. In this way, the conference module executed by the computer device 8301 may receive the processed audio signal 801 and provide it to the remote computer device 850. The conference module executed by the remote computer device 850 in this embodiment may simply only receive the processed audio signal 801 returned by the computer device 830_1, instead of simultaneously receiving the audio signals 821 and 831 provided by the transmitting end modules 810_2 and 810_3, so as to effectively reduce or avoid the occurrence of audio echo (preventing all audio played through the speakers of computer devices from being re-recorded by their microphones which causes severe echo), which may provide excellent audio quality for conferences.

In addition, if the computer devices 830_1 to 830_3 all execute the conference module, the conference modules of the computer device 830_1 to 830_3 do not play the processed audio signal 801, but may selectively play the audio signal provided by the remote computer device 850, and the conference modules of the computer devices 830_2 and 830_3 may selectively play the processed audio signal 801 and the audio signal provided by the remote computer device 850 (e.g., the second user and the third user use earphones to play audio), and not play their own respective audio signal.

In another embodiment, the display module 860 may also include a microphone device. The display module 860 may provide the audio signal provided by the microphone device to the transmitting end module 810_1 through the receiving end module 820, so that the transmitting end module 810_1 may process all the audio signals to generate the processed audio signal 801. In another embodiment, assuming that the conference moderator uses the microphone device of the display module 860, the transmitting end module 810_1 may only retain and optimize the audio signal provided by the microphone device of the display module 860 to generate the processed audio signal 801 (other audio signals may be filtered or the volume may be reduced).

Figure 9:
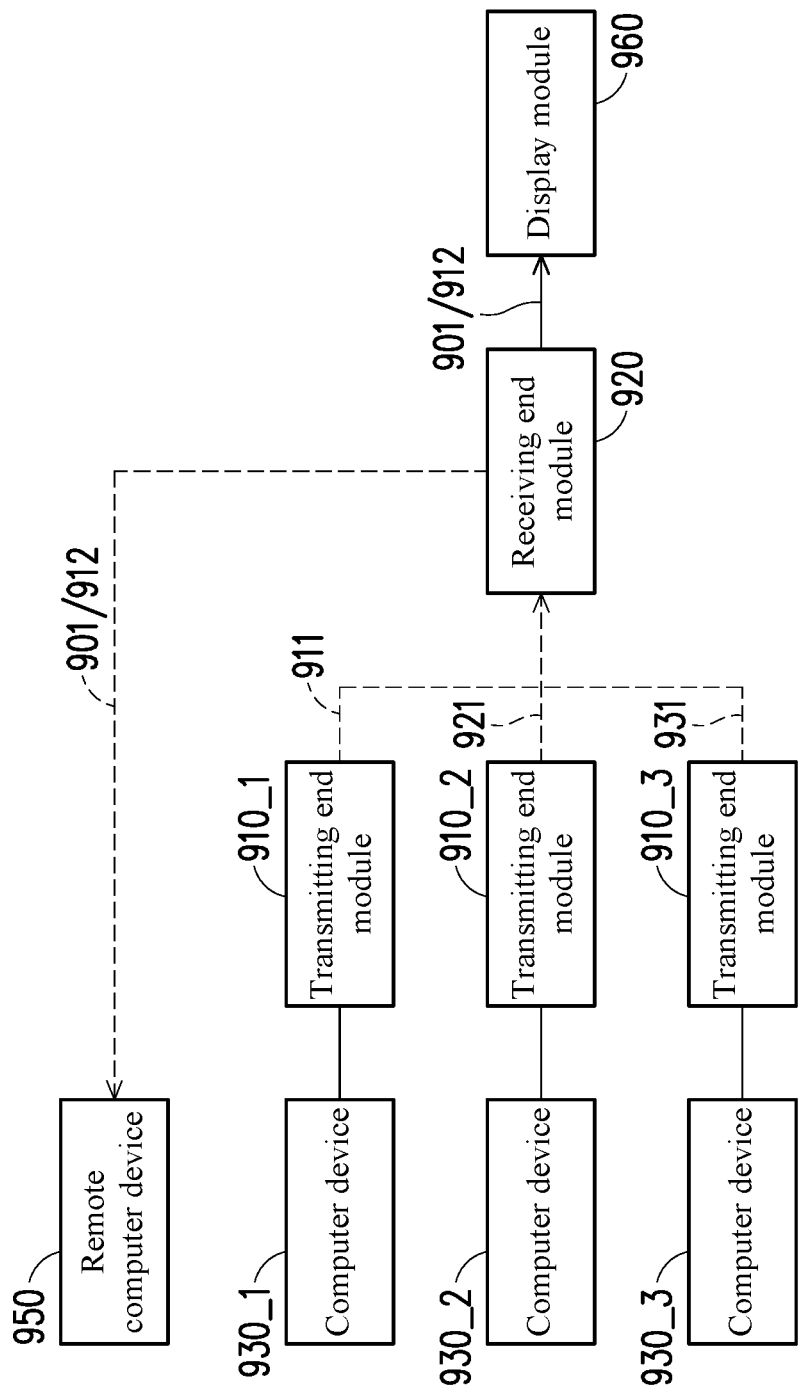
FIG. 9 is a schematic diagram of a video and audio streaming transmission system according to another embodiment of the disclosure.

FIG. 9 is a schematic diagram of a video and audio streaming transmission system according to another embodiment of the disclosure. Referring to FIG. 9, three transmitting end modules 910_1 to 910_3 in conjunction with three computer devices 930_1 to 930_3 are used as an example embodiment for description. In this embodiment, the transmitting end modules 910_1 to 910_3 are coupled to the computer devices 930_1 to 930_3 and the receiving end module 920. The receiving end module 920 is coupled to the display module 960. The computer devices 930_1 to 930_3 may execute the conference module to connect with the remote computer device 950 for online conference. It should be noted that the hardware features, technical features, and implementation methods of the related devices and modules described in this embodiment may refer to the descriptions of other embodiments to obtain sufficient teachings, suggestions, and implementation instructions, so details are not repeated herein.

In this embodiment, the first user may operate the computer device 930_1 to conduct an online conference. The microphone device of the transmitting end module 910_1 may collect sound to collect the voice of the first user and the ambient sound (possibly including the voice of the second user and/or the third user) to generate an audio signal 911 (which may also be generated by the built-in microphone device of the computer device 930_1). In this embodiment, the transmitting end module 910_1 may transmit the audio signal 911 to the receiving end module 920.

The second user may operate the computer device 930_2 to conduct an online conference, or the user simply operates the computer device 930_2 to implement the wireless microphone function to simply provide the audio of the user without executing the conference module. The microphone device of the transmitting end module 9102 may collect sound to collect the voice of the second user and the ambient sound (possibly including the voice of the first user and/or the third user) to generate an audio signal 921 (which may also be generated by the built-in microphone device of the computer device 930_2, and provided to the transmitting end module 910_2). The transmitting end module 910_2 may transmit the audio signal 921 to the receiving end module 920.

The third user may operate the computer device 930_3 to conduct an online conference, or simply operate the computer device 930_3 to implement the wireless microphone function to simply provide the audio of the user without executing the conference module. The microphone device of the transmitting end module 910_3 may collect sound to collect the voice of the third user and the ambient sound (possibly including the voice of the first user and/or the second user) to generate an audio signal 931 (which may also be generated by the built-in microphone device of the computer device 930_3, and provided to the transmitting end module 910_3). The transmitting end module 910_3 may transmit the audio signal 931 to the receiving end module 920.

In this embodiment, the receiving end module 920 may generate the processed audio signal 901 according to the audio signals 911, 921, and 931. The processed audio signal 901 may, for example, undergo the audio processing described in the above-mentioned embodiments, so details are not repeated herein. In one embodiment, the first user may be a conference moderator, but the disclosure is not limited thereto. The receiving end module 920 may only retain and optimize the audio signal 911 to generate the processed audio signal 901 (the audio signals 921 and 931 may be filtered or the volume may be reduced). In this embodiment, the receiving end module 920 may also have an image processing function, but the disclosure is not limited thereto. The receiving end module 920 may receive the image data provided by at least one of the computer devices 930_1 to 930_3 through the corresponding transmitting end module, and the receiving end module 920 may perform image synthesis on the received image signal (i.e., image data, which may be, for example, presentation data, video and audio data, screen sharing data, or video image data, etc.) to generate a synthesized image signal 912. In this regard, if the receiving end module 920 receives multiple image signals provided by multiple computer devices, the receiving end module 920 may synthesize these image signals to generate a synthesized image signal 912. If the receiving end module 920 receives an image signal provided by a computer device, the receiving end module 920 may directly use the image signal as the synthesized image signal 912.

In this embodiment, the receiving end module 920 may execute a conference module. The receiving end module 920 may provide the processed audio signal 901 and the synthesized image signal 912 to the display module 960 for display and playback, and the receiving end module 920 may directly provide the processed audio signal 901 and synthesized image signal 912 to the remote computer device 950 through the conference module. In this way, the computer device 930_1 may send the image signal 912 to the remote computer device 450. The conference module executed by the remote computer device 950 in this embodiment may simply only receive the processed audio signal 901 returned by the receiving end module 920, instead of simultaneously receiving the audio signals 911, 921, and 931 respectively provided by the transmitting end modules 910_1, 910_2, and 910_3, so as to effectively reduce or avoid the occurrence of audio echo (preventing all audio played through the speakers of computer devices from being re-recorded by their microphones which causes severe echo), which may provide excellent audio quality for conferences.

In addition, if the computer devices 930_1 to 930_3 all execute the conference module, the conference modules executed by the computer devices 930_1 to 930_3 may selectively play the audio signal provided by the remote computer device 950 (which may be set by the respective users, and the users can, for example, use earphones to play audio and not play their own respective audio signal).

In an embodiment, the display module 960 may also include a microphone device. The display module 960 may provide the audio signal provided by the microphone device to the receiving end module 920, so that the receiving end module 920 may process the audio signals 911 and 921 and the audio signal provided by the microphone device of the display module 960 to generate the processed audio signal 901. In another embodiment, assuming that the conference moderator uses the microphone device of the display module 960, the receiving end module 920 may only retain and optimize the audio signal provided by the microphone device of the display module 960 to generate the processed audio signal 901 (the audio signals 911, 921, and 931 may be filtered or the volume may be reduced).

To sum up, the video and audio streaming transmission system of the disclosure may collect multiple audio signals provided by multiple transmitting end modules through the receiving end module, the audio synthesis is conducted by a receiving end module or a transmitting end module to generate a processed audio signal. Then, the video and audio streaming transmission system of the disclosure may transmit the audio signal to the conference module directly through a transmitting end module or a receiving end module. Therefore, the conference module may simply only receive the processed audio signal returned by a single signal source, instead of simultaneously receiving multiple audio signals provided by the multiple transmitting end modules, so as to effectively reduce or avoid the occurrence of audio echo (preventing all audio played through the speakers of computer devices from being re-recorded by their microphones which causes severe echo), which may provide excellent audio quality for conferences. Moreover, the video and audio streaming transmission system of the disclosure may also receive video and audio signals provided by multiple transmitting end modules through the receiving end module, and merge and display them on the display module.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A video and audio streaming transmission system, suitable for use in conjunction with a conference module for video and audio streaming transmission, wherein the video and audio streaming transmission system comprises:
 a receiving end module;
 a first transmitting end module, coupled to a first computer device and the receiving end module, wherein the first computer device executes the conference module; and
 a second transmitting end module, coupled to a second computer device and the receiving end module, wherein the second computer device executes the conference module,
 wherein the first transmitting end module obtains a first audio signal, and the first transmitting end module sends the first audio signal to the receiving end module,
 wherein the second transmitting end module obtains a second audio signal, and the second transmitting end module sends the second audio signal to the receiving end module,
 wherein the receiving end module returns a processed audio signal to the first computer device according to the first audio signal and the second audio signal, so that the first computer device provides the processed audio signal to the conference module.

2. The video and audio streaming transmission system according to claim 1, wherein the first computer device establishes a virtual microphone device according to the first transmitting end module, and the first computer device selects the virtual microphone device to join a remote conference conducted by the conference module.

3. The video and audio streaming transmission system according to claim 2, wherein the first audio signal is generated by collecting sound through the first transmitting end module or through the first computer device, and the virtual microphone device diverts the first audio signal to the receiving end module.

4. The video and audio streaming transmission system according to claim 1, wherein the conference module is an online conference software, and the conference module sends the processed audio signal received through the first computer device to a remote computer device executing the conference module.

5. The video and audio streaming transmission system according to claim 1, wherein the conference module sets the first computer device as a conference moderator, and the conference module provides the processed audio signal to a remote computer device executing the conference module.

6. The video and audio streaming transmission system according to claim 1, wherein the first transmitting end module comprises a physical device, the physical device is coupled to the first computer device through wired communication, and the physical device is coupled to the receiving end module through wireless communication.

7. The video and audio streaming transmission system according to claim 1, wherein the first transmitting end module further comprises an application program, and the first computer device installs and executes the application program, so that the application program is connected to the receiving end module, wherein the first computer device and the receiving end module are disposed in a same network area, and the receiving end module returns the processed audio signal through a network and the application program.

8. The video and audio streaming transmission system according to claim 1, wherein the first transmitting end module is an application program, and the first computer device installs and executes the application program, so that the application program is connected to the receiving end module, wherein the first computer device and the receiving end module are disposed in a same network area.

9. The video and audio streaming transmission system according to claim 1, wherein the second transmitting end module is an application program, and the second computer device installs and executes the application program, so that the application program is connected to the receiving end module, wherein the second computer device and the receiving end module are disposed in a same network area.

10. The video and audio streaming transmission system according to claim 1, wherein the receiving end module is coupled to a microphone device, and the microphone device provides a third audio signal to the receiving end module, the receiving end module processes the first audio signal, the second audio signal, and the third audio signal to generate the processed audio signal.

11. The video and audio streaming transmission system according to claim 1, further comprising:

a central management device, connected to the receiving end module and configured to set the first transmitting end module as an audio diversion target.

12. The video and audio streaming transmission system according to claim 11, wherein the central management device is further configured to set whether to provide the processed audio signal to a speaker device coupled to the receiving end module.

13. The video and audio streaming transmission system according to claim 11, wherein the central management device is further configured to set an audio source for generating the processed audio signal.

14. The video and audio streaming transmission system according to claim 1, wherein the receiving end module comprises a first audio processing chip, and the first audio processing chip is configured to generate the processed audio signal.

15. The video and audio streaming transmission system according to claim 1, wherein the first transmitting end module comprises a second audio processing chip, and the second audio processing chip is configured to perform audio processing on the first audio signal.

16. The video and audio streaming transmission system according to claim 1, wherein the first computer device executes an audio processing module, and the audio processing module is configured to perform audio processing on the first audio signal.

17. The video and audio streaming transmission system according to claim 1, wherein the receiving end module is coupled to a display module, and the receiving end module provides the processed audio signal to the display module.

18. The video and audio streaming transmission system according to claim 17, wherein the display module comprises a microphone device, and the display module provides a third audio signal provided by the microphone device to the receiving end module, the receiving end module processes the first audio signal, the second audio signal, and the third audio signal to generate the processed audio signal.

19. A video and audio streaming transmission system, suitable for use in conjunction with a conference module for video and audio streaming transmission, wherein the video and audio streaming transmission system comprises:
   a receiving end module;
   a first transmitting end module, coupled to a first computer device and the receiving end module, wherein the first computer device executes the conference module; and
   a second transmitting end module, coupled to a second computer device and the receiving end module, wherein the second computer device executes the conference module,
   wherein the first transmitting end module obtains a first audio signal,
   wherein the second transmitting end module obtains a second audio signal, and the second transmitting end module sends the second audio signal to the receiving end module, so that the receiving end module sends the second audio signal to the first transmitting end module,
   wherein the first transmitting end module generates a processed audio signal to the first computer device according to the first audio signal and the second audio signal, so that the first computer device provides the processed audio signal to the conference module.

20. A video and audio streaming transmission system, suitable for use in conjunction with a conference module for video and audio streaming transmission, wherein the video and audio streaming transmission system comprises:
   a receiving end module;
   a first transmitting end module, coupled to a first computer device and the receiving end module, wherein the first computer device executes the conference module; and
   a second transmitting end module, coupled to a second computer device and the receiving end module, wherein the second computer device executes the conference module,
   wherein the first transmitting end module obtains a first audio signal, and the first transmitting end module sends the first audio signal to the receiving end module,
   wherein the second transmitting end module obtains a second audio signal, and the second transmitting end module sends the second audio signal to the receiving end module,
   wherein the receiving end module executes the conference module, and the receiving end module provides a processed audio signal to the conference module according to the first audio signal and the second audio signal.

* * * * *